May 17, 1938.  J. T. ROBSON ET AL  2,117,994

KILN

Filed Feb. 4, 1937  4 Sheets-Sheet 1

INVENTORS
JAMES T. ROBSON
GEORGE R. SYLVESTER
BY
Richey & Watts
ATTORNEYS

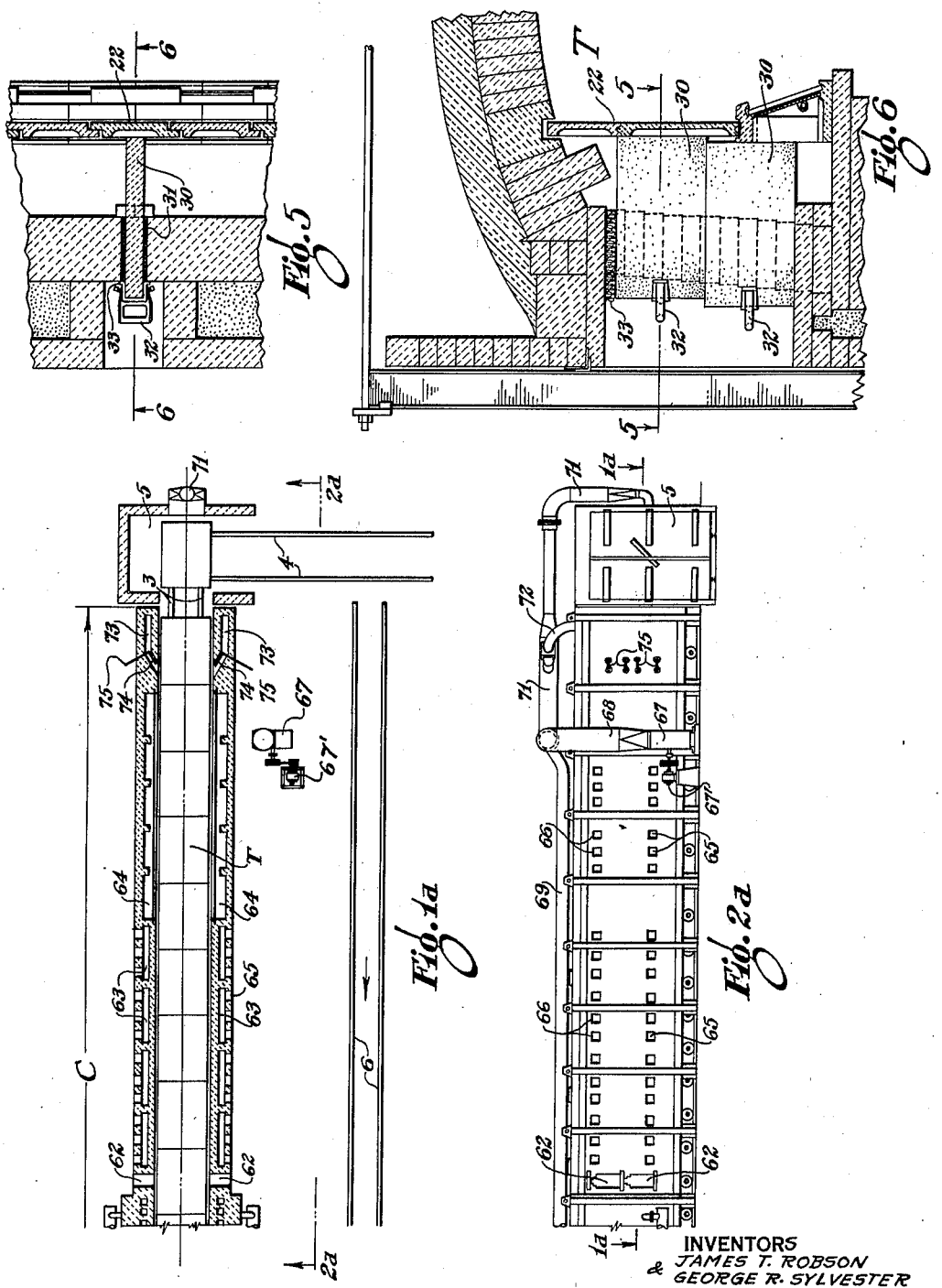

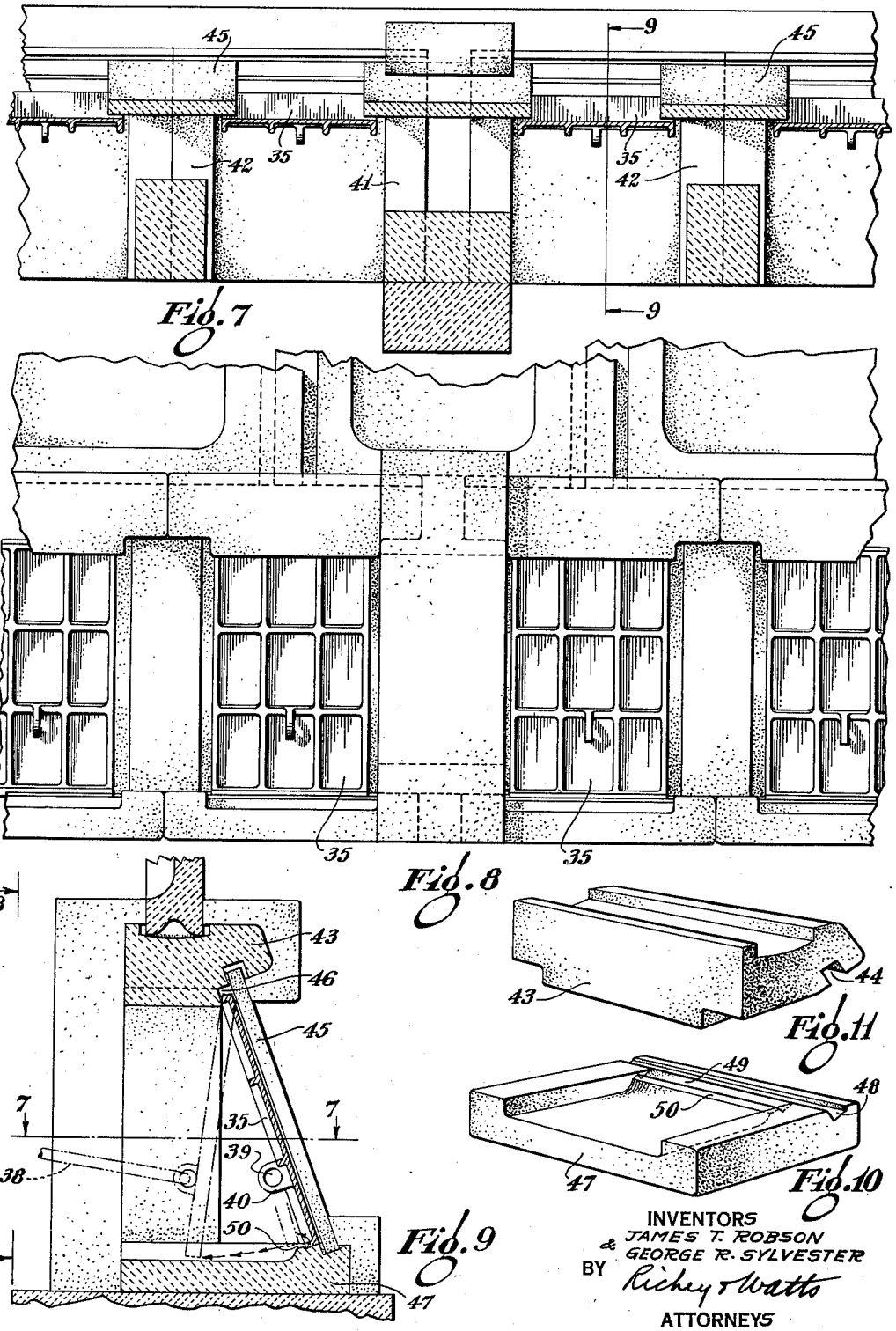

Patented May 17, 1938

2,117,994

UNITED STATES PATENT OFFICE 2,117,994

KILN

James T. Robson, Euclid, and George R. Sylvester, Cleveland, Ohio, assignors to Ferro Enamel Corporation, Cleveland, Ohio, a corporation of Ohio Application February 4, 1937, Serial No. 124,158

9 Claims. (Cl. 25—142)

This invention relates to improvements in kilns and more particularly to improvements in tunnel kilns or the like for continuously burning ceramic ware such as china, pottery, etc. However, it will be seen by those skilled in the art that a number of the features of our invention may be adapted to other uses such as continuous heating or annealing furnaces, etc.

In our co-pending United States patent application, Serial No. 88,180, filed June 30, 1936, we have described and claimed certain improvements in direct fired tunnel type kilns, and the apparatus described herein incorporates some of the features described and claimed in our said co-pending application.

This application relates to indirectly fired or muffle type kilns and to an improved structure whereby combinations of direct and indirect heating may be obtained. It is among the objects of our invention to provide a continuous kiln of the type described in which the temperature and atmosphere in the preheating, firing and cooling zones may be readily and accurately controlled to obtain the desired treatment of the ware passing through the kiln. Another object of our invention is the provision of a kiln structure which may be operated as either a direct fired or indirectly fired kiln in which the products of combustion may be either permitted to pass freely into contact with the ware or in which the ware may be maintained out of contact with the products of combustion.

Other objects of our invention will appear from the following description of one embodiment thereof, reference being had to the accompanying drawings, in which—

Figure 1 is a plan section of the pre-heating and firing zones and a portion of the cooling zone of our improved kiln. This view is taken substantially on line 1—1 of Figure 2.

Figure 1ª is a view similar to Figure 1 but illustrating the remaining portion of the cooling zone of the kiln.

Figure 2 is a side elevation of that portion of the kiln illustrated in Figure 1.

Figure 2ª is a view similar to Figure 2 but illustrating in side elevation that portion of the kiln shown in plan section in Figure 1ª.

Figure 5 is a horizontal cross-section taken on line 5—5 of Figure 6 illustrating a sliding control damper construction.

Figure 6 is an enlarged fragmentary vertical cross-section taken on line 6—6 of Figure 2 and illustrating the arrangement of the sliding adjustable back draft control damper for the firing zone combustion chamber.

Figure 7 is an enlarged horizontal cross-section taken on line 7—7 of Figure 9 and illustrating the arrangement of the adjustable plates which provide means for connecting the combustion chambers with the tunnel chamber.

Figure 8 is a view of the portion of the kiln shown in Figure 7 and taken substantially on line 8—8 of Figure 9.

Figure 9 is an enlarged vertical section through one of the swinging plates which provide the adjustable connection between the combustion chambers and the tunnel chamber through which the ware moves.

Figure 10 is a detached perspective view of one of the bottom refractory members which support the adjustable plates shown in Figures 7, 8 and 9.

Figure 11 is a detached perspective view of one of the top refractory members which support the upper ends of the closure plates shown in Figures 7, 8 and 9.

Figure 1:
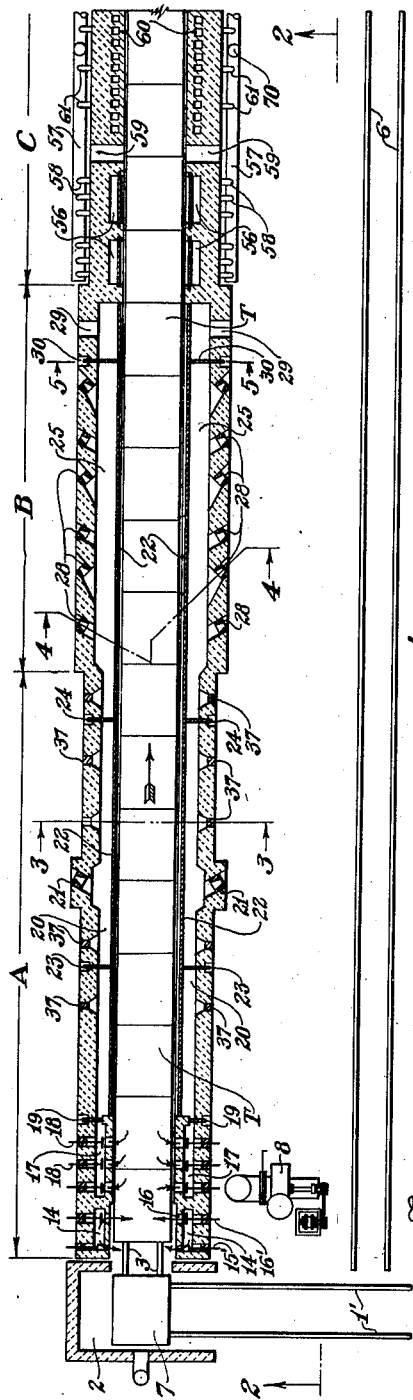

Referring now to Figures 1, 1ª, 2 and 2ª, the general arrangement of the kiln includes the tracks 1 extending into the entering chamber 2, the tracks 3 which extend throughout the length of the kiln and on which the ware carrying cars move through the kiln, the tracks 4 which convey the ware out of the exit chamber 5, and the return tracks 6 which return the cars to the entering end of the kiln. Between the entering chamber 2 and the exit chamber 5 the kiln may be considered to be divided into three sections or zones, the pre-heating section being indicated at A in Figure 1, the firing or furnace section being indicated at B in Figure 1 and the cooling section being indicated at C in Figures 1 and 1ª. For convenience and to avoid confusion these three sections or zones will be described in the order in which the ware passes through them.

The pre-heating zone

Figure 4:
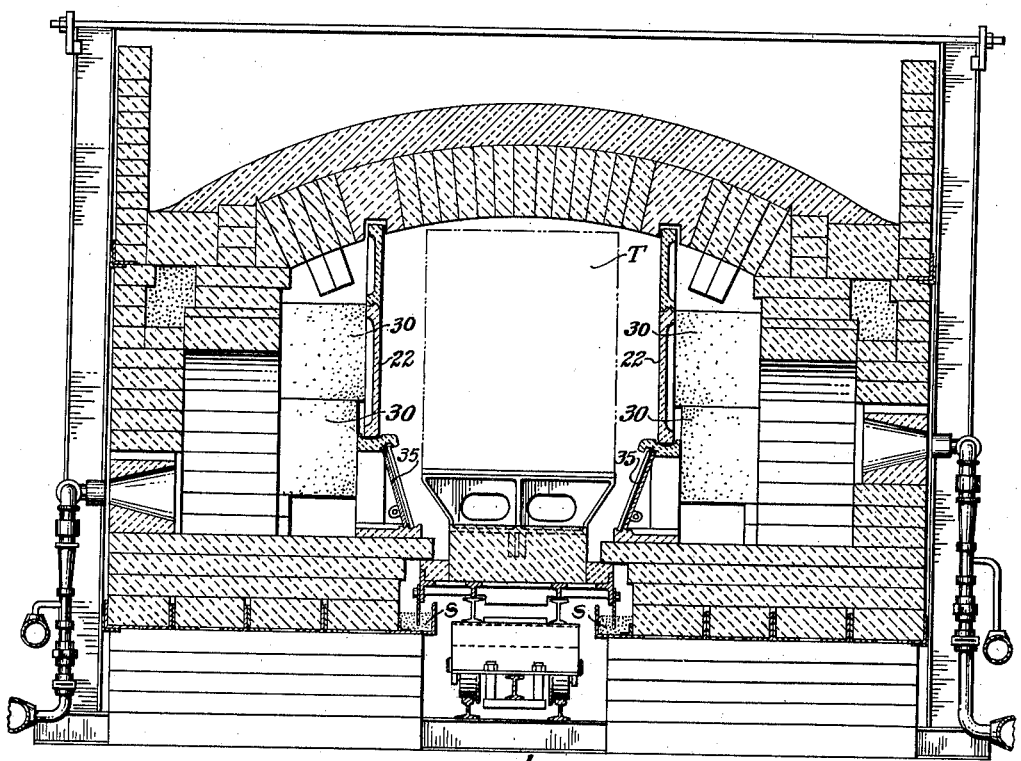
Figure 4 is an enlarged vertical cross-section taken substantially on line 4—4 of Figure 1.
Figure 3:
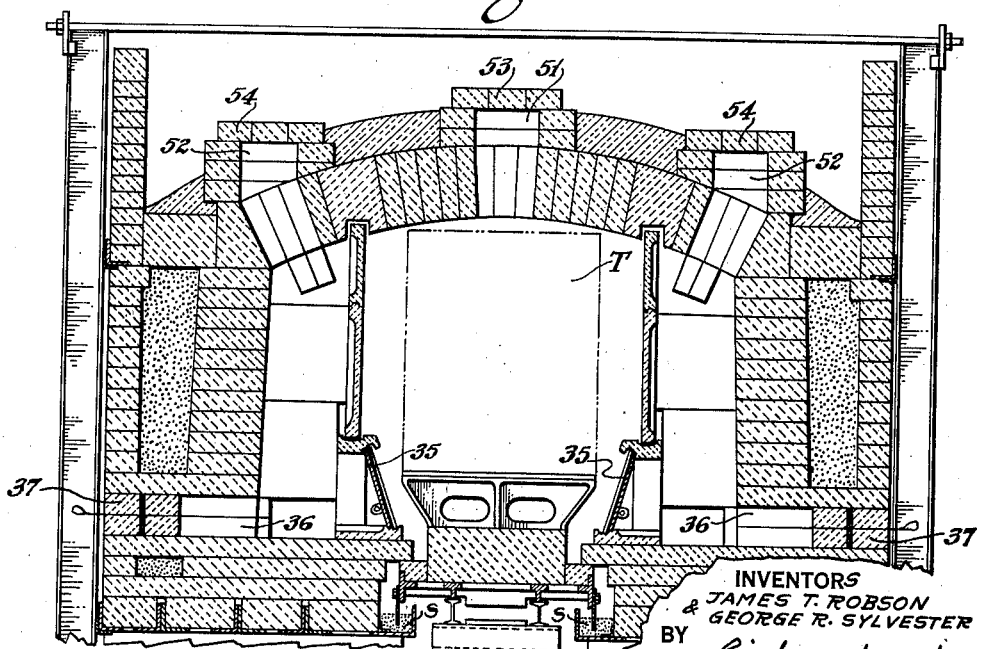
Figure 3 is an enlarged vertical cross-section of the kiln taken substantially on line 3—3 of Figure 1.

The cars 7 on which the ware is loaded pass into the entering chamber 2 on the tracks 1 and are transferred to the tracks 3 on which they move through the tunnel chamber T. As illustrated, the cars are moved through the kiln in contact with each other and when a loaded car enters at the pre-heating end another car leaves the cooling end and is withdrawn to be unloaded. The ware is supported on the cars in the upper portion of the tunnel T, which upper portion may be referred to as the ware space and is sealed from the lower portion of the tunnel T by the sand seals shown at S (Figs. 3 and 4). As the cars pass into the entering chamber 2 and the end of the pre-heating zone A they are given a preliminary heating by means of circulating hot gases from the pre-heating zone. This circulation is effected by a fan or blower 8 which has an inlet pipe 9 connected to a transversely extending chamber 10 which in turn is connected by suitable passages to the tunnel chamber T and the side chambers 17. The outlet of the blower 8 is through the pipe 11 and the branch pipes 12 and 13. The pipe 12 extends into the end of the entering chamber 2 and directs a blast of hot gas at the lower portion of the ware on the cars as they enter the kiln. The pipes 13, of which there are two, one disposed on each side of the furnace, discharge hot gas into the chambers 14 (Fig. 1) from which it is discharged against the ware through the vertical slots 15 and the openings 16. As is illustrated diagrammatically in Figure 1 the openings 15 and 16 are provided with adjustable closure members or plugs 15' and 16' whereby the circulation of gas may be controlled. These plugs are adapted to be operated from outside of the kiln to vary the size of the openings 15 and 16.

Just beyond the chambers 14 in the direction of ware travel are the chambers 17. These chambers are connected at their upper ends to the transversely extending header chamber 10 and thus are adapted to withdraw gas from the tunnel chamber T under the suction of the blower fan 8. This is indicated by the arrows in Figure 1. The passages which connect the chambers 17 with the tunnel chamber are also equipped with adjustable closure members 18 which are generally similar to the closure members 16'. Adjustable sliding damper plates 19 provide partial end closures for the chambers 17 whereby their connection with the combustion chambers 20 of the pre-heating zone A may be varied. The structural arrangement of these dampers 19 is substantially the same as those which will be described later and which are illustrated in detail in Figures 5 and 6.

The pre-heating zone combustion chambers 20 are equipped with angularly directed burners 21 in which oil, gas or other suitable fuel may be burned and which are adapted to direct their flames and products of combustion into the combustion chambers 20. In the operation of the kiln as a completely indirect fired structure or muffle kiln the heat is transferred to the ware through the refractory walls 22 of the kiln tunnel chamber T. As is best seen in Figure 1 the burners 21 are directed so that their flames impinge against the walls 22 of the tunnel chamber at an angle thus distributing the heat more effectively thereover and creating a movement of the products of combustion in a direction opposite to the movement of ware through the tunnel. Pairs of sliding dampers 23 and 24 are disposed on either side of the burners 21. The dampers 23 serve to control and regulate the passage of the hot gases and products of combustion from the burners 21 toward the entering end of the kiln and the dampers 24 serve to regulate the passage between the combustion chambers 25 of the furnace or firing section B and the combustion chambers 20 of the pre-heating section A.

It will be understood by those skilled in the art that the sets of dampers 19, 23 and 24 will be regulated and controlled in such a manner that the desired distribution of heat along the tunnel chamber T will be obtained. Normally the dampers 19 will be at least partially open so that the products of combustion from the firing zone combustion chambers 25 and the pre-heating section combustion chambers 20 will be withdrawn from the kiln through the chambers 17 and the header 10 by the blower 8. A stack 26 extends up from the blower outlet pipe 11 and a valve 27 controls the distribution of outlet gases between the stack 26 and the preliminary heating pipes 12 and 13. Of course additional valves may be provided if deemed desirable or necessary properly to control the exhaust gases.

*The firing zone*

Figure 2:
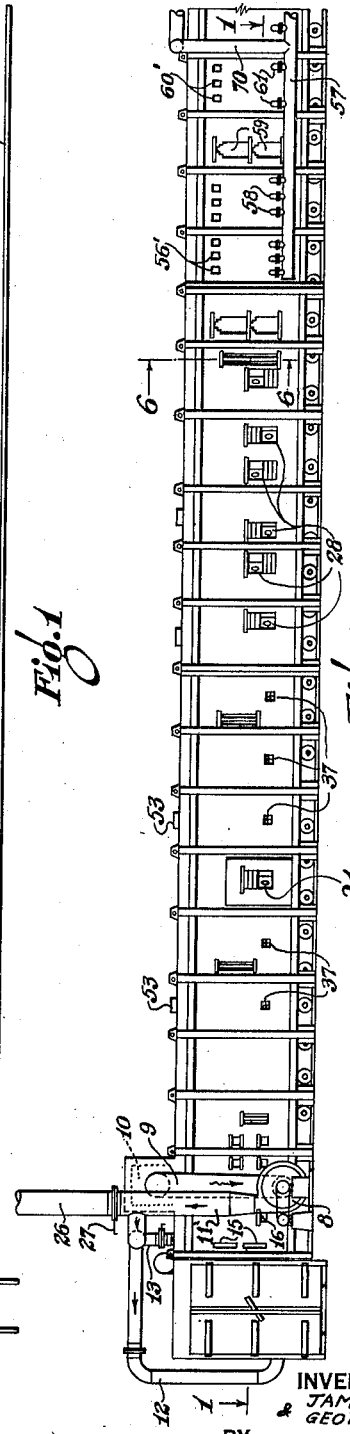

The zone of highest temperature in the kiln, where the actual firing of the ware takes place, is indicated at B in Figure 1. This zone comprises chambers 25, of somewhat greater cross section than the pre-heating zone combustion chambers 20. A plurality of burners 28, which may be supplied with oil or gas in any suitable manner (not shown), are disposed in the outer walls of each of the chambers 25. These burners are adapted to direct their flames and products of combustion against the tunnel walls 22 at an angle and in a direction opposite to that of the movement of the ware through the tunnel. Also, as shown in Figure 2, the burners 28 preferably are disposed at different heights in the kiln walls so that the heat therefrom may be evenly distributed over the inner refractory walls 22 which form the tunnel chambers. Cool air inlet or back draft ports 29 are provided at the end of the firing zone B whereby air at atmospheric temperature may enter the combustion chambers 25.

The amount of air so entering is controlled by the adjustable back draft control dampers 30. By varying the amount of cool air which is permitted to pass the dampers 30 control of the temperature within the firing zone is facilitated. In Figures 5 and 6 the back draft control dampers 30 and their supporting arrangement are illustrated in detail. On each side of the tunnel there are two sliding damper panels 30 arranged one above the other and each extending through a slot 31 in the outer walls of the combustion chambers 25. Each damper panel 30 is provided with a handle 32 by which it may be slid toward or away from the inner refractory wall 22 of the tunnel. Packing material 33, such as asbestos or the like, is preferably disposed between the walls of the slot 31 and the dampers 30 in order to insure a close sliding fit of the dampers in the slot. As seen in Figure 6 the damper panels are shown in their closed position and it will be understood that the operator, by pulling outwardly on the handle members 32, can adjust the positions of either one or both of the panels 30 to give the desired degree of opening. In the illustrated construction the panels 30 do not at any time completely shut off the passage in which they are disposed although they are adapted to greatly reduce the area thereof. It will be understood by those skilled in the art that if desired these dampers may be arranged so that the passage which they control can be completely closed.

Another feature of our improved kiln construction which is common to both the pre-heating zone and the firing zone is the arrangement of adjustable plates 35 at the bottom of the side walls 22 of the tunnel chamber T. These plates 35 are best illustrated in Figures 3, 4, 7, 8 and 9 and may be either of temperature resisting metallic alloy or of refractory material. Opposite each plate 35, in the outer walls of the kiln, is an aperture 36 which is normally closed by a removable plug 37. As seen in Figures 3 and 4 the plates 35 are in their closed position, forming a substantially gas tight wall between the inside of the tunnel T and the combustion chambers. As is seen in Figure 2 the plugged apertures 36 are regularly spaced along the entire length of the kiln and as will be seen from Figures 7 and 8 the plates 35 are preferably spaced quite close together. If it is desired to convert the kiln from muffle to direct fired, or if for any reason it is found desirable to provide a passageway between the interior of the tunnel T and any part of the side chambers of the kiln, any required number of the plates 35 may be swung back into the position illustrated in dot and dash lines in Figure 9.

This swinging may conveniently be effected by removing the plugs 37 and inserting a hooked rod 38 (Fig. 9) which is adapted to engage the hole 39 in the lug 40 on the plate or door 35. As the refractory structure at the bottom portion of the inner walls 22 of the tunnel T is provided with longitudinally extending apertures 41 and 42 (see Fig. 7) it will be seen that when the plates 35 are swung back into their open position a free passage for gas is provided between the combustion chambers and the interior of the kiln around the side edges of the open plates 35. Of course, after the desired adjustment of the plates 35 has been made the plugs 36 may be reinserted.

By suitably regulating the bottom plates 35 the operation of the kiln can be accurately controlled and any desired combination of muffle and direct fired structure can be obtained. Figures 10 and 11 illustrate the refractory blocks which form the upper and lower supports for the bottom plates 35. The upper refractory support 43 is provided with slots 44 in which the permanent angularly disposed refractory panels 45 are held. The upper edges of the plates 35 rest against the surface 46 of the blocks 43 and pivot thereabout when they are swung into opened position. The bottom supporting blocks 47 are also notched or grooved at 48 for the bottom edge of a refractory panel 45 and are provided with a bottom notch 49 for a closure plate 35. When it is desired to open one of the plates 35 it is merely necessary to insert the rod 38 through the hole 39 and lift the plate 35 until the lower edge thereof can swing over the lip 50 of the bottom plate 47, whereupon the plate 35 may be swung back to any desired degree of opening.

In order to permit more accurate control of conditions within the kiln we provide tunnel relief ports 51 and combustion chamber relief ports 52 (see Figs. 2 and 3). These relief ports may be closed by refractory covers 53 and 54 respectively and when open provide connections between the atmosphere and the tunnel and combustion chambers. These crown relief ports are particularly effective in preventing the forcing of gas from the combustion chambers into the top of the ware chamber with resulting production of dull ware and are effective in controlling the kiln temperatures and atmosphere.

*The cooling section*

The cooling section C of the kiln follows the firing zone B in the direction of movement of the ware. As is seen in Figures 1, 1ª, 2 and 2ª the cooling zone comprises an indirect quick cooling section having refractory panel walls 55 which are cooled by air forced into the chambers 56 through the header pipes 57 and branch pipes 58. Atmospheric relief ports 59 extend through the walls of the kiln into the tunnel chamber T between the chambers 56 and the checker work cooling section 60. In these sections 60 of the kiln cold air is passed from the headers 57 through branch pipes 61 into a checker brick structure of any desired form. Another set of atmospheric relief ports 62 follow the checker sections 60 and are in turn followed by natural draft cooling sections 63 having refractory inner walls and sheet metal lined cooling sections 64 having metallic inner walls. The natural draft cooling sections 63 and 64 are provided with bottom openings 65 and top outlet openings 66. The natural flow of air through these cooling chambers 63 and 64 provides effective cooling at the relatively low temperatures encountered in this portion of the kiln.

A blower 67, which may be driven by a motor 67', is adapted to force air at atmospheric temperature through the pipe 68, the pipe 69, the downwardly extending pipes 70, and the headers 57 into the indirect cooling sections or chambers 56 and 60. This air passes out of chambers 56 and 60 through apertures such as 56' and 60' in the upper portions of the chambers. If desired this heated air may be conveyed by suitable pipes (not shown) and used for heating the shop or other purposes.

The blower 67 is also adapted to direct cool air through the pipes 71 and 72 to the chambers 73' (see Figs. 1ª and 2ª) from whence the cool air is discharged directly into the tunnel T in a direction opposite to the movement of the ware. Adjustable dampers 74 may be operated from outside the kiln by means of the operating rods 75 to control this flow of air directly into the tunnel chamber. The pipe 71 extends on beyond the branch pipes 72 and conveys air into the exit chamber 5 of the kiln.

From the above description of one embodiment of our improved kiln structure it will be seen that we have provided an exceedingly adaptable arrangement for firing ceramic ware or for other heating operations. With our arrangement very accurate control of both the temperature and atmosphere in all parts of the kiln is readily obtained. The structure may be operated either as a muffle or direct fired type of heater and may be changed from one to the other form without the necessity of shutting down.

Although we have described the illustrated embodiment of our invention in considerable detail it will be understood by those skilled in the art that our structure is subject to modification and variation and we do not, therefore, wish to be limited to the specific details and forms described and illustrated herein, but claim as our invention all embodiments thereof coming within the scope of the appended claims.

We claim:

1. In a kiln structure of the type described having a tunnel chamber, said chamber including a ware space, means for conveying ware through said ware space, and a combustion chamber adjacent said ware space, said ware space and combustion chamber having a common wall, said common wall having a plurality of openings adjacent the lower portion thereof, adjustable cover panels for said openings, said panels being movable to open or close said openings, the outer walls of the combustion chamber opposite said panels having apertures through which the panels may be adjusted, and means for plugging said apertures.

2. In a kiln, walls defining a tunnel chamber ware space and a combustion chamber, an aperture extending through one of said walls from said combustion chamber to said ware space, and means for closing said aperture, said closing means being operable from outside of said kiln to open said aperture.

3. A combination kiln structure having a tunnel chamber ware space and combustion chambers disposed along each side thereof, said ware space and combustion chambers having common walls, said walls having a plurality of openings extending therethrough, said openings having independently operable closure means.

4. A combination kiln structure having a tunnel chamber ware space and combustion chambers disposed along each side thereof, said ware space and combustion chambers having common walls, said walls having a plurality of openings extending therethrough, said openings having independently operable closure means, each of said closure means being adapted to be moved from outside of said kiln structure during operation of said kiln.

5. In a tunnel kiln of the indirectly fired or muffle type having a tunnel chamber, said tunnel chamber including a ware space and a combustion chamber, a relief port from said ware space to the atmosphere, a relief port from said combustion chamber to the atmosphere, independent means for closing each of said relief ports, a port extending from said combustion chamber to said ware space and adjustable means for closing said last named port.

6. In apparatus of the type described, walls defining a tunnel chamber and a combustion chamber extending longitudinally of said tunnel chamber, and a combustion chamber damper comprising a plurality of superposed plates extending through a slot in the outer wall of said combustion chamber, said plates being independently movable transversely of the combustion chamber.

7. In apparatus of the type described, walls defining a tunnel chamber and a combustion chamber extending longitudinally of said tunnel chamber, and a combustion chamber damper comprising a plurality of superposed plates extending through a slot in the outer wall of said combustion chamber, said plates being independently movable transversely of the combustion chamber, and resilient packing in said slot around said plates.

8. In apparatus of the type described, walls defining a tunnel chamber and a combustion chamber extending longitudinally of said tunnel chamber, and a combustion chamber damper comprising a plurality of superposed plates extending through a slot in the outer wall of said combustion chamber, said plates having handles whereby they may be independently moved from outside said chambers to vary the effective cross-sectional area of said combustion chamber.

9. In apparatus of the type described, walls defining a tunnel chamber and a heating chamber, and a damper comprising a plurality of superposed refractory plates extending through a slot in the outer wall of said heating chamber, said plates being adapted for sliding movement in said slot to vary the effective cross-sectional area of said heating chamber.

JAMES T. ROBSON.
GEORGE R. SYLVESTER.